(12) United States Patent
Dalisay (10) Patent No.: US 10,320,173 B2
(45) Date of Patent: Jun. 11, 2019

(54) CONDUIT SUPPORT ASSEMBLY (71) Applicant: Atkore Steel Components, Inc., Coconut Creek, FL (US)

(72) Inventor: George Dalisay, Hollywood, FL (US)

(73) Assignee: Atkore Steel Components, Inc., Coconut Creek, FL (US)

(*) Notice: Subject to any disclaimer, the term of this patent is extended or adjusted under 35 U.S.C. 154(b) by 0 days.

(21) Appl. No.: 15/471,746

(22) Filed: Mar. 28, 2017

(65) Prior Publication Data
US 2018/0283583 A1    Oct. 4, 2018

(51) Int. Cl.
| F16L 3/00 | (2006.01) |
| H02G 3/00 | (2006.01) |
| H02G 3/04 | (2006.01) |
| F16L 3/223 | (2006.01) |
| F16L 3/227 | (2006.01) |

(52) U.S. Cl.
CPC ............ *H02G 3/263* (2013.01); *H02G 3/0443* (2013.01); *F16L 3/227* (2013.01); *F16L 3/2235* (2013.01)

(58) Field of Classification Search
CPC ............ F16L 3/2235; F16L 3/237; F16L 3/24
USPC .................... 138/106, 107; 248/61, 542, 68.1
See application file for complete search history.

(56) References Cited

U.S. PATENT DOCUMENTS

| 325,767 | A | * | 9/1885 | Prior | ......................... F16L 3/12 248/74.1 |
| 2,003,159 | A | * | 5/1935 | Taylor | .................... B65G 51/18 248/62 |
| 2,354,919 | A | * | 8/1944 | Lockwood | ............ F16L 3/2235 248/68.1 |
| 2,394,240 | A | * | 2/1946 | Harrison | ............... F16L 3/2235 174/40 CC |
| 2,972,460 | A | * | 2/1961 | Kenyon | ................... F16L 3/133 248/62 |
| 3,042,352 | A | * | 7/1962 | Stamper | .................. F16L 3/227 248/68.1 |
| 3,353,775 | A | | 11/1967 | Sebo | |
| 3,856,245 | A | | 12/1974 | Byerly | |
| 4,032,096 | A | * | 6/1977 | Perrault | ..................... F16L 3/08 248/220.21 |
| 4,119,285 | A | * | 10/1978 | Bisping | ..................... F16L 3/24 248/72 |
| 4,709,887 | A | * | 12/1987 | Bongiovanni | ........ F16L 3/2235 248/66 |
| 4,790,060 | A | * | 12/1988 | Council | .................... F16L 3/12 248/68.1 |
| 4,957,251 | A | | 9/1990 | Hubbard | |

(Continued)

*Primary Examiner* — Patrick F Brinson (57) ABSTRACT

Provided herein are approaches for supporting a plurality of parallel arranged conduits. In some approaches, a conduit assembly includes a plurality of conduits arranged substantially parallel to one another, and a support structure directly adjacent to and/or in physical contact with each of the plurality of conduits. The support structure may include a first member arranged parallel to a second member, wherein the first and second members are arranged transverse to a lengthwise conduit axis of the plurality of conduits. Each of the first and second members may further include a first section disposed around an exterior surface of the plurality of conduits, and a second section continuing from the first section, the second section extending between each of the plurality of conduits.

8 Claims, 6 Drawing Sheets

(56) References Cited

U.S. PATENT DOCUMENTS

| | | | | |
|---|---|---|---|---|
| 4,960,253 | A | * | 10/1990 | Perrault .................... F16L 3/22 |
| | | | | 248/68.1 |
| 5,181,680 | A | * | 1/1993 | Coll ....................... F16L 3/237 |
| | | | | 248/542 |
| 5,564,659 | A | | 10/1996 | DeCapo |
| 5,593,115 | A | * | 1/1997 | Lewis .................... F16L 3/227 |
| | | | | 248/200.1 |
| 5,931,423 | A | | 8/1999 | Heideloff |
| 5,971,329 | A | | 10/1999 | Hickey |
| 5,984,243 | A | * | 11/1999 | Pfaller .................. F16L 3/1066 |
| | | | | 248/74.1 |
| 6,073,891 | A | | 6/2000 | Humber |
| 6,216,320 | B1 | * | 4/2001 | Schauermann ........... F16L 3/24 |
| | | | | 24/293 |
| 6,783,101 | B2 | * | 8/2004 | Knotts ................. F16L 3/2235 |
| | | | | 211/60.1 |
| 7,261,256 | B2 | * | 8/2007 | Pattie ...................... F16L 3/233 |
| | | | | 244/129.1 |
| 7,766,285 | B2 | * | 8/2010 | Cox ..................... F16L 3/1233 |
| | | | | 248/302 |
| 7,770,851 | B2 | * | 8/2010 | Michaud .................. F16L 3/04 |
| | | | | 248/65 |
| 7,784,745 | B2 | * | 8/2010 | Dodge ...................... F16L 3/24 |
| | | | | 138/149 |
| 8,558,112 | B2 | * | 10/2013 | Pawluk ............... H02G 3/0437 |
| | | | | 174/68.1 |
| 8,770,537 | B2 | * | 7/2014 | Go ....................... E02F 9/2275 |
| | | | | 212/347 |
| 9,903,512 | B2 | * | 2/2018 | Sixsmith ................ F16L 3/24 |
| 2003/0038217 | A1 | | 2/2003 | Rivers et al. |
| 2007/0102593 | A1 | | 5/2007 | Riedy et al. |

\* cited by examiner

CONDUIT SUPPORT ASSEMBLY

FIELD OF THE DISCLOSURE

The disclosure relates generally to conduit assemblies and, more particularly, to a wire-formed support assembly for supporting a plurality of conduits.

BACKGROUND OF THE DISCLOSURE

Electrical and mechanical components such as cables often are connected with each other through various angles and configurations. Conduits (e.g., pipes) and junction boxes may be used to house electrical cables, and connectors are used to join conduits with each other and/or with other components such as junction boxes in desired configurations. Connector assemblies make use of such connector elements as connector bodies, nuts, gaskets, etc., to provide the configurations desired for the conduits that house electrical and mechanical components.

In some approaches, wiring installations in commercial buildings arrange a group of conduits so that they extend generally parallel to each other for relatively long distances in or close to the same plane. These conduits are periodically supported at regular intervals. In one approach, a typical conduit supporting structure, commonly referred to as conduit strap or clamp support, consists of sheet metal straps/clamps and channels that are assembled together using screws. However, current straps/supports require extensive processes and labor to fabricate, and produce large amounts of wasted material.

SUMMARY

In view of the foregoing, what is needed is a conduit support assembly with a simplified design for ease of manufacture and assembly.

An example conduit assembly in accordance with the present disclosure may include a plurality of conduits arranged substantially parallel to one another, and a support structure directly adjacent each of the plurality of conduits. The support structure may include a first member arranged parallel to a second member, wherein the first and second members are arranged transverse to a lengthwise conduit axis of the plurality of conduits. Each of the first and second members may further include a first section disposed around an exterior surface of the plurality of conduits, and a second section continuing from the first section, the second section extending between each of the plurality of conduits.

Another example conduit assembly in accordance with the present disclosure may include a plurality of conduits arranged parallel to one another along a lengthwise conduit axis, and a support structure extending across the plurality of conduits, transverse to the lengthwise conduit axis. The support structure may include a first member arranged parallel to a second member, wherein the first and second members are arranged transverse to the lengthwise conduit axis of the plurality of conduits. Each of the first and second members may further include a first section disposed around an exterior surface of the plurality of conduits and a second section continuing from the first section, the second section extending between each of the plurality of conduits. The conduit assembly may further include a support fastener extending through an opening defined by the second section of the support structure.

Yet another example conduit assembly in accordance with the present disclosure may include a plurality of conduits arranged parallel to one another along a lengthwise conduit axis, and a support structure extending across the plurality of conduits, transverse to the lengthwise conduit axis. The support structure may include a first section disposed around an exterior surface of the plurality of conduits, the first section being in direct physical contact with the plurality of conduits, and a second section continuing from the first section, the second section extending between each of the plurality of conduits. The conduit assembly may further include a strut, wherein the support structure is directly coupled to the strut. The conduit assembly may further include a plurality of openings through the strut, wherein the support structure extends through a first opening of the plurality of openings, and a support fastener extends through a second opening of the plurality of openings and couples the support structure to the strut.

BRIEF DESCRIPTION OF THE DRAWINGS

The accompanying drawings illustrate example approaches of the disclosed embodiments so far devised for the practical application of the principles thereof.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Assemblies and methods in accordance with the present disclosure will now be described more fully hereinafter with reference to the accompanying drawings, where embodiments of the system and method are shown. The assemblies may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

As used herein, the terms "over", "to", "between" and "on" may refer to a relative position of one component or element with respect to other components or elements. One component "over" or "on" another component or bonded "to" another component may be directly in contact with the other component or may have one or more intervening components. One component "between" components may be directly in contact with the components or may have one or more intervening components. Further, the terms "attached" and "coupled" may mean directly adjacent to or in direct contact with another element or may mean in a close physical relationship with another element without being directly adjacent to or in direct contact with the other element.

Provided herein are approaches for supporting a plurality of parallel arranged conduits. In some approaches, a conduit assembly includes a plurality of conduits arranged parallel to one another, and a support structure in direct physical contact with each of the plurality of conduits. The support structure may include a first section disposed around an exterior surface of the plurality of conduits, and a second section continuing from the first section, the second section extending between each of the plurality of conduits. In some approaches, the support structure includes a first member arranged parallel to a second member, wherein the first and second members are arranged transverse to a lengthwise conduit axis of the plurality of conduits. In some approaches, a support fastener may extend through an opening defined by the second section of the support structure, for example, between the first and second members. In some embodiments, the support structure is a single unitary piece of wire or rod formed, for example, using a programmable wire-forming machine. As a result, by employing a single length of wire or rod, only a single manufacturing process is required, thus reducing labor and avoiding material waste.

Figure 1:
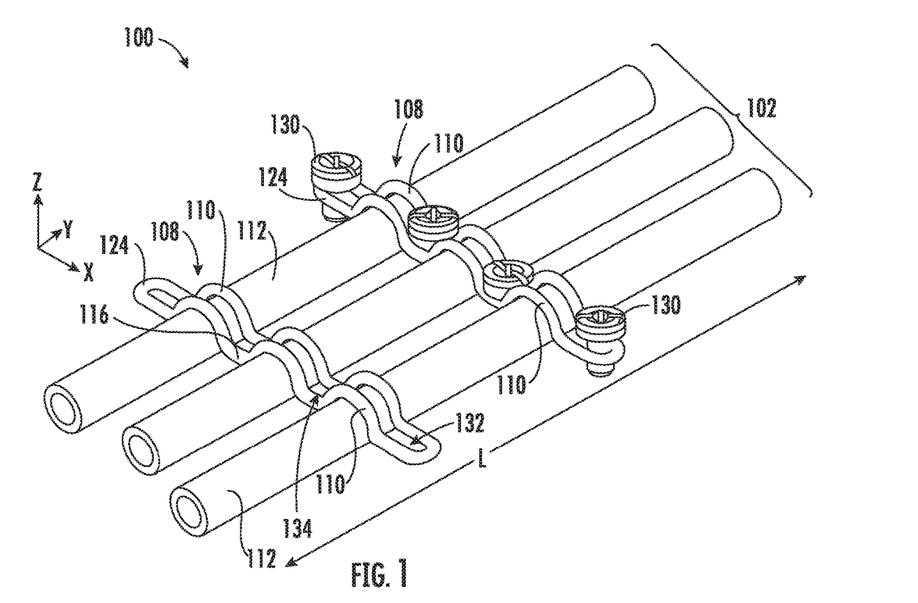
FIG. 1 is a perspective view of a conduit assembly in accordance with embodiments of the present disclosure.
Figure 2:
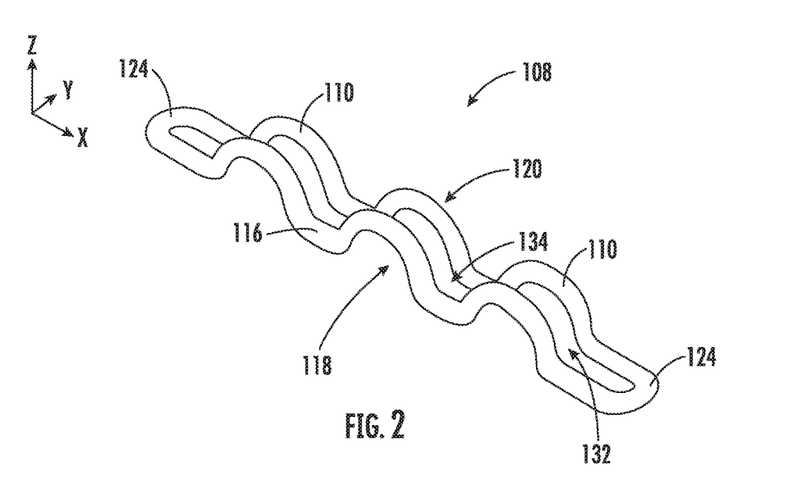
FIG. 2 is a perspective view of a support structure of the conduit assembly of FIG. 1 in accordance with embodiments of the present disclosure.
Figure 3:
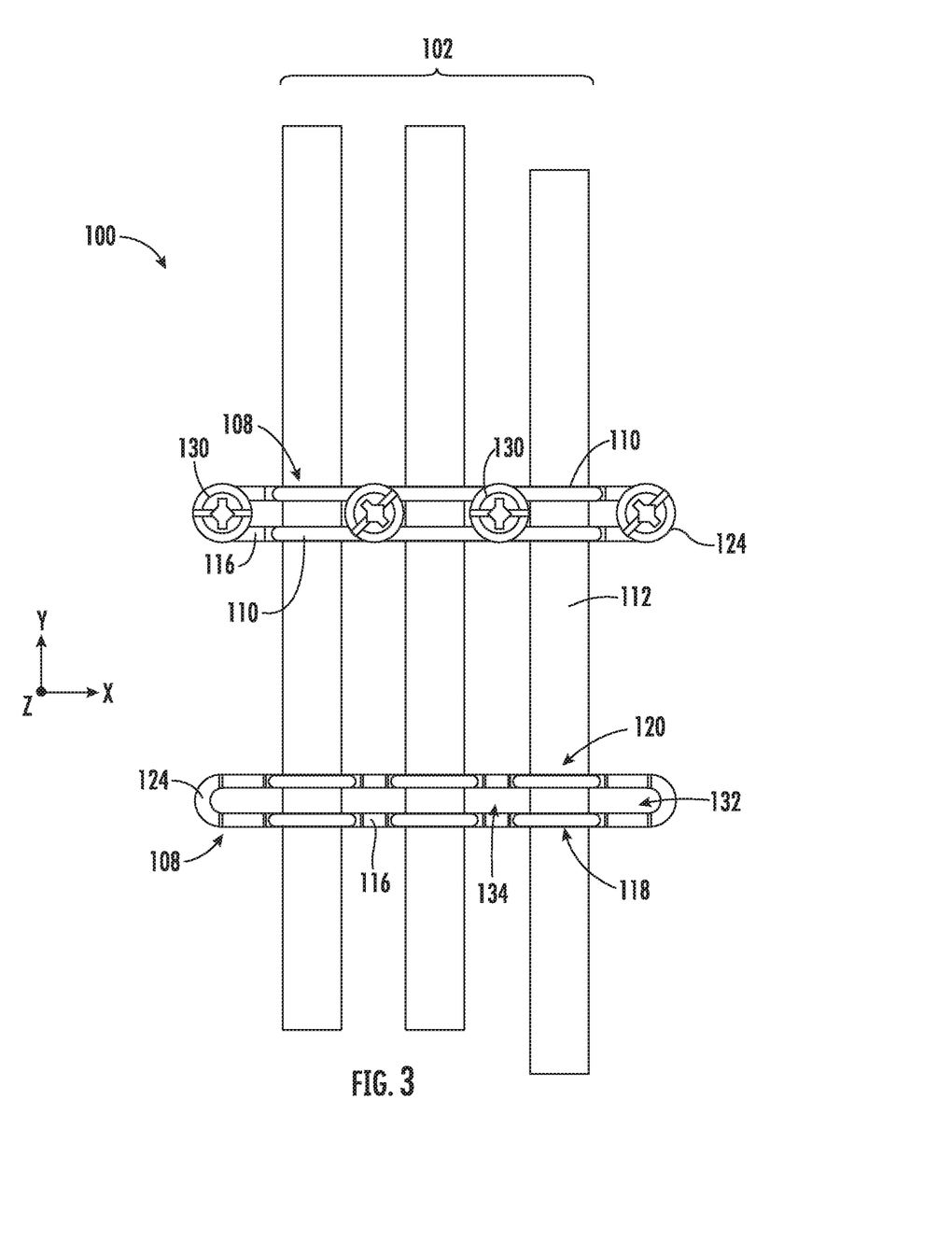
FIG. 3 is top view of the conduit assembly of FIG. 1 in accordance with embodiments of the present disclosure.

Referring now to FIGS. 1-3, an example embodiment of a conduit assembly 100 in accordance with the present disclosure is shown. FIG. 1 is a perspective view of the conduit assembly 100, FIG. 2 is a perspective view of a support structure of the conduit assembly 100 of FIG. 1, and FIG. 3 is top view of the conduit assembly 100 of FIG. 1. As shown, the conduit assembly 100 may include a plurality of conduits 102 arranged parallel, or substantially parallel, to one another, for example, along a lengthwise conduit axis L extending in a y-direction. In example embodiments, each of the conduits 102 may be a rigid or flexible pipe or tube used to house electrical cables. The conduits 102 may be joined with other conduits and/or other components such as junction boxes in desired configurations. Connector assemblies make use of such connector elements as connector bodies, nuts, gaskets, etc., to provide the configurations desired for the conduits that house electrical and mechanical components. It will be appreciated that embodiments of the present disclosure are not limited to any particular number of conduits.

As further shown, the conduit assembly 100 may include one or more support structures 108 extending across the plurality of conduits 102, e.g., transverse to the lengthwise conduit axis L, along an x-direction. For ease of explanation hereinafter, the x-direction/axis is shown oriented perpendicular to the y-direction/axis, and defines an x-y plane. Furthermore, a z-direction/axis is shown oriented transverse to each of the x and y directions. It will be appreciated the directions referred to herein are in the frame of reference of the structures as depicted.

The support structures 108 may be provided directly adjacent to and/or in direct physical contact with each of the plurality of conduits 102 to provide support thereto. The support structures 108 include a first section 110 disposed around an exterior surface 112 of the conduits 102, and a second section 116, continuing from the first section 110. The second section 116 may extend between each of the conduits 102. In some embodiments, the first section 110 may be generally curvilinear, and the second section 116 may be generally straight. Furthermore, the first section 110 may be shaped/dimensioned to conform to an outer circumference of the conduits 102.

As further shown, the support structure 108 may include a first member 118 arranged parallel, or substantially parallel, to a second member 120. The first and second members 118, 120 may be arranged transverse to the lengthwise conduit axis L of the conduits 102, e.g., along the x-direction. Each of the first and second members 118, 120 consists of one or more first and second sections 110, 116. Furthermore, as shown, the first and second members 118, 120 may be joined together by one or more closed-loop ends 124. In the embodiment shown, the support structure 108 includes multiple closed-loop ends 124 on opposite sides. Together, the first and second members 118, 120 define a central opening 132 extending between each closed-loop end 124. In some approaches, the support structure 108 may be a single unitary piece of wire or rod.

In some embodiments, the closed-loop ends 124 receive a support fastener 130 (e.g., a screw, bolt, rivet, etc.) therein, the support fastener 130 coupling the support structure 108 to another component (not shown), such as a wall, ceiling, or strut. As further shown, one or more support fasteners 130 may also extend through an opening 134 defined by the second section 116 of the support structure 108, between the first and second members 118, 120. In one embodiment, a support fastener 130 is provided between each of the conduits 102.

Figure 4:
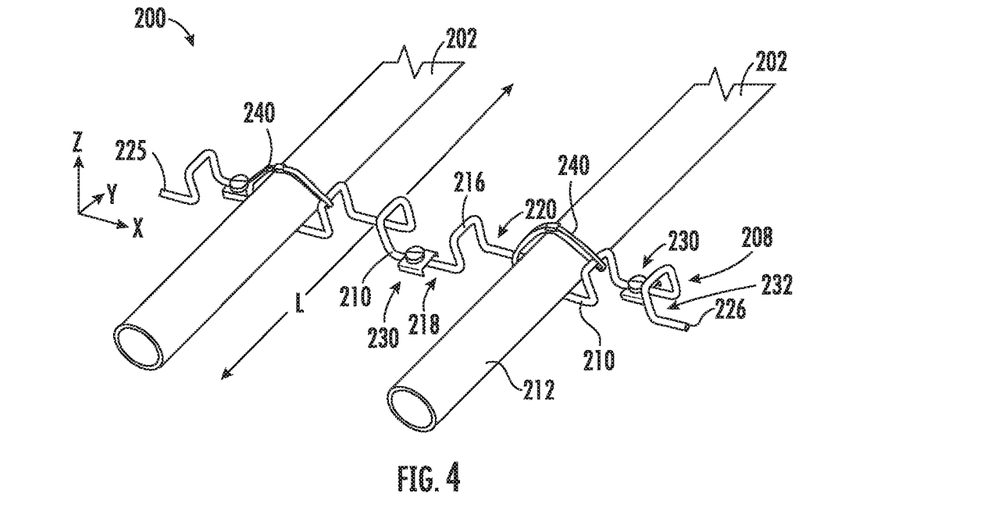
FIG. 4 is a perspective view another example conduit assembly in accordance with an embodiment of the present disclosure.
Figure 5:
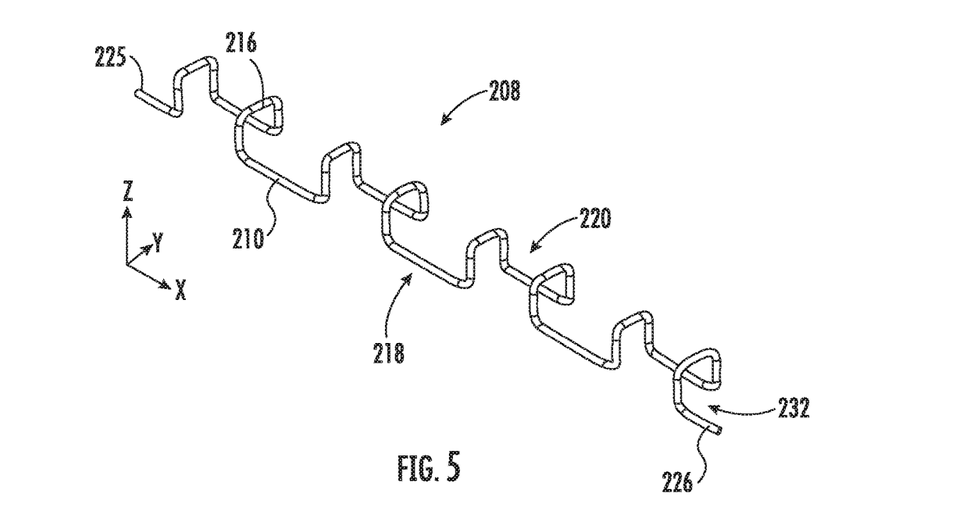
FIG. 5 is a perspective view of a support structure of the conduit assembly of FIG. 4 in accordance with embodiments of the present disclosure.
Figure 6:
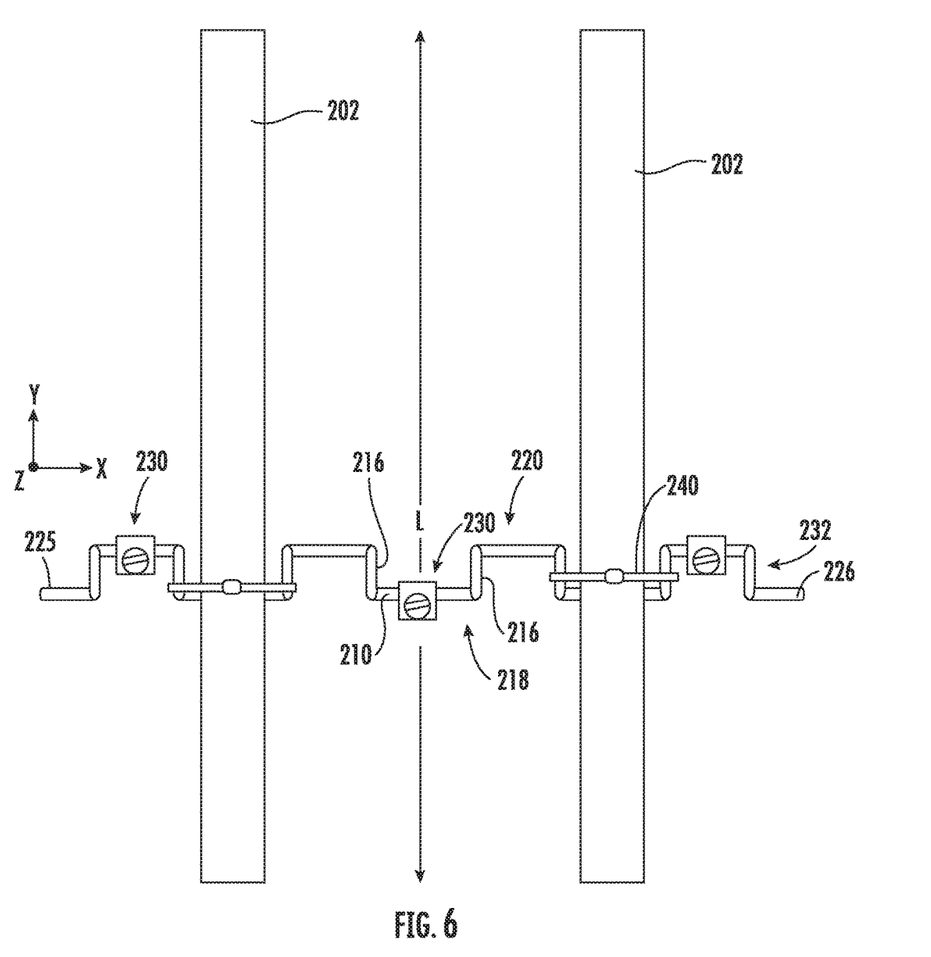
FIG. 6 is top view of the conduit assembly of FIG. 4 in accordance with embodiments of the present disclosure.

Turning now to FIGS. 4-6, another example embodiment of a conduit assembly 200 in accordance with the present disclosure is shown. FIG. 4 is a perspective view of the conduit assembly 200, FIG. 5 is a perspective view of a support structure of the conduit assembly 200 of FIG. 4, and FIG. 6 is top view of the conduit assembly 200 of FIG. 4. As shown, the conduit assembly 200 may include a plurality of conduits 202 arranged parallel, or substantially parallel, to one another, for example, along a lengthwise conduit axis L extending in a y-direction. In example embodiments, each of the conduits 202 may be a rigid or flexible pipe or tube used to house electrical cables. It will be appreciated that embodiments of the present disclosure are not limited to any particular number of conduits.

As further shown, the conduit assembly 200 may include one or more support structures 208 extending across the plurality of conduits 202, e.g., transverse to the lengthwise conduit axis L, along the x-direction. The support structures 208 may be provided directly adjacent to and/or in direct physical contact with each of the plurality of conduits 202 to provide support thereto. The support structures 208 may include a first section 210 disposed around an exterior surface 212 of the conduits 202, and a second section 216, continuing from the first section 210. The second section 216 may extend between each of the conduits 202. In some embodiments, the second section 216 may include one or more bends, and the first section 210 may be generally straight. As shown, the first section 210 and the second section 216 may be oriented perpendicular to one another. For example, the first section 210 may extend generally along the x-direction, whereas the second section 216 may extend generally along the y-direction and the z-direction. Furthermore, the first section 210 and the second section 216 may be shaped/dimensioned to permit entry of the conduits 202 therebetween.

As further shown, the support structure 208 may include a first member 218 arranged parallel, or substantially parallel, to a second member 220. The first and second members 218, 220 may be arranged transverse to the lengthwise conduit axis L of the conduits 202. Each of the first and second members 218, 220 consists of multiple first and second sections 210, 216. Furthermore, as shown, the first and second members 218, 220 are offset from one another along the y-direction. In the embodiment shown, the support structure 208 may include first and second free ends 225, 226 on opposite sides. Together, the first and second members 218, 220 of the support structure 208 define a central opening 232 extending along the x-direction.

In some embodiments, the first section 210 is secured by a support clamp 230 (e.g., a screw, bolt, rivet, etc., extending through a bracket) to another component (not shown), such as a wall, ceiling, or strut. As further shown, the support clamp 230 may be coupled to both the first and second members 218, 220. In one embodiment, the support clamp 230 is provided between each of the conduits 202. Furthermore, a support strap 240 may be coupled to the second section 216 such that the support strap 240 extends around the exterior surface 212 of the conduits 202. In some embodiments, the support strap 240 may be a fastener (e.g., a cable tie) secured about the conduits 202 after the support structure 208 is engaged with the conduits 202. The support strap 240 may prevent the conduits 202 from separating from the support structure 208.

Figure 7:
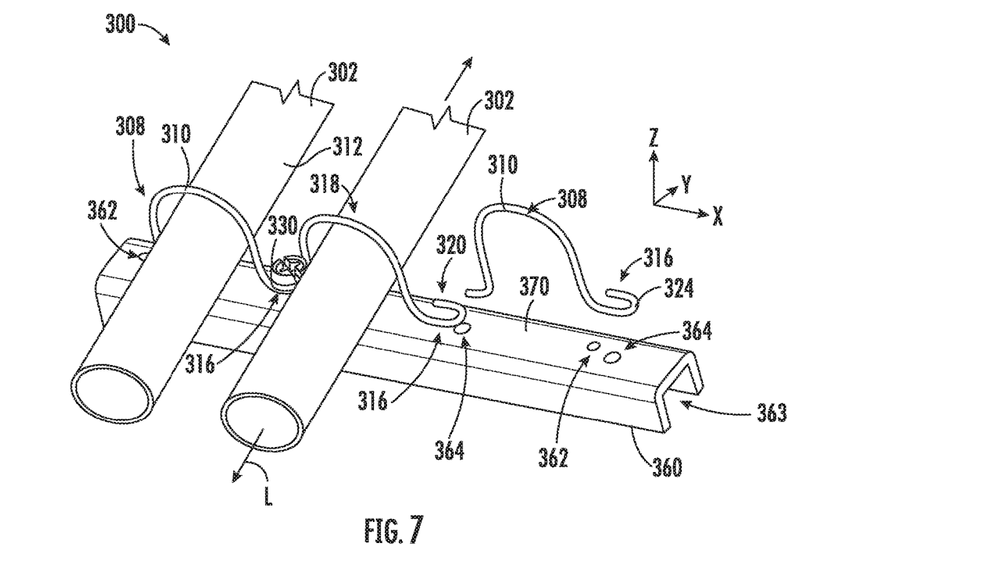
FIG. 7 is a perspective view another example conduit assembly in accordance with an embodiment of the present disclosure.
Figure 8:
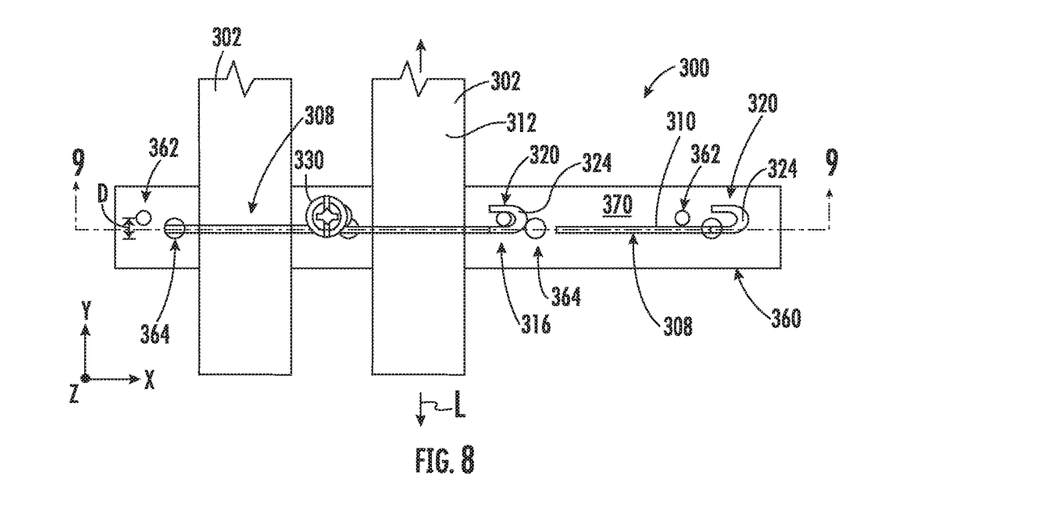
FIG. 8 is a top view of the conduit assembly of FIG. 7 in accordance with embodiments of the present disclosure.
Figure 9:
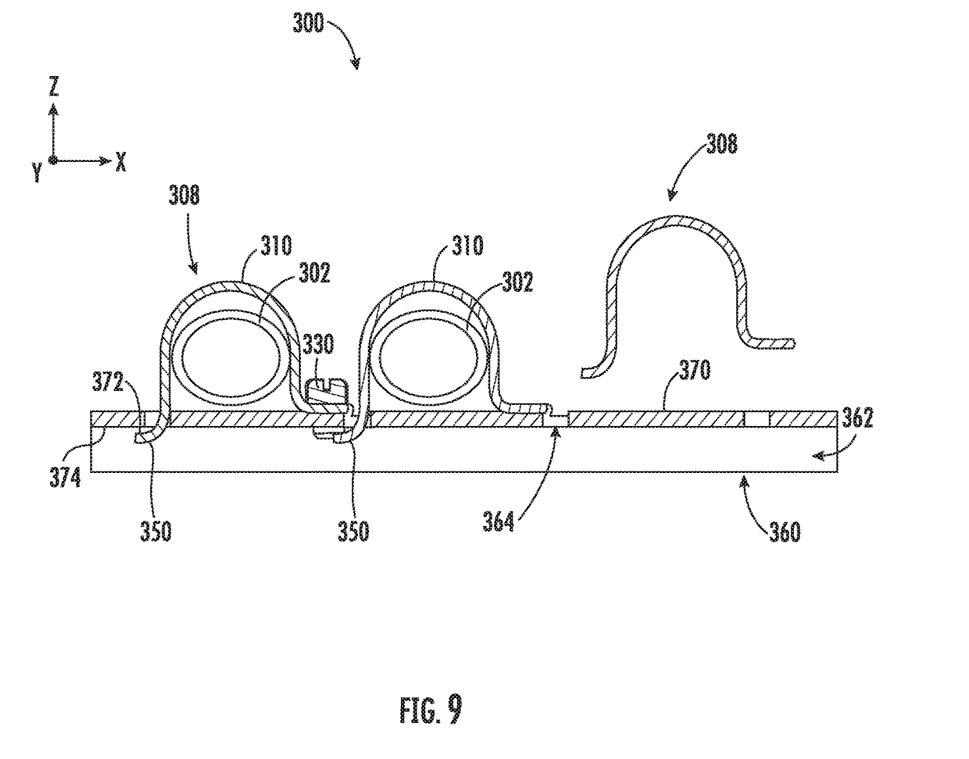
FIG. 9 is a side cutaway view the conduit assembly of FIG. 8 in accordance with an embodiment of the present disclosure.

Referring now to FIGS. 7-9, an example embodiment of a conduit assembly 300 in accordance with the present disclosure is shown. FIG. 7 is a perspective view of the conduit assembly 300, FIG. 8 is a top view of the conduit assembly 300 of FIG. 7, and FIG. 9 is a side cross-sectional view of the conduit assembly 300 of FIG. 8. As shown, the conduit assembly 300 may include a plurality of conduits 302 arranged parallel, or substantially parallel, to one another, for example, along a lengthwise conduit axis L extending in a y-direction. In example embodiments, each of the conduits 302 may be a rigid or flexible pipe or tube used to house electrical cables.

As further shown, the conduit assembly 300 may include one or more support structures 308 extending across the plurality of conduits 302, e.g., transverse to the lengthwise conduit axis L, along an x-direction. The support structures 308 may be provided adjacent to and/or in direct physical contact with each of the plurality of conduits 302 to provide support thereto. The support structures 308 include a first section 310 disposed around an exterior surface 312 of the conduits 302, and a second section 316, continuing from the first section 310, the second section 316 extending between each of the conduits 302. In some embodiments, the first section 310 may be generally curvilinear, and the second section 316 may be generally straight. Furthermore, the first section 310 may be shaped/dimensioned to conform to an outer circumference of the conduits 302. In some embodiments, each of the support structures 308 takes on a generally U-shape.

As further shown, the support structure 308 may include a first member 318 arranged parallel, or substantially parallel, to a second member 320. The first and second members 318, 320 may be arranged transverse to the lengthwise conduit axis L of the conduits 302. Each of the first and second members 318, 320 consists of the first and second sections 310, 316. Furthermore, as shown, the first and second members 318, 320 may be joined together by one or more closed-loop ends 324. In the embodiment shown, the support structure 308 includes a closed-loop end 324 opposite a free end 350.

As further shown, the conduit assembly 300 may include a strut 360 having an interior channel 363 and a plurality of openings 362, 364 provided therein, wherein the support structures 308 are coupled to the strut 360 for securing the conduits 302 adjacent the strut 360. More specifically, the free end 350 of each support structure 308 may be inserted through openings 364, terminating within the interior channel 363, and the close-loop end 324 of each support structure 308 may be coupled to and terminate along an exterior surface 370 of the strut 360. In some embodiments, the closed-loop ends 324 receive a support fastener 330 (e.g., a screw, bolt, rivet, etc.) therein, the support fastener 330 extending through openings 362 to couple the support structure 308 to the strut 360. In some embodiments, the free end 350 may be curved so that an upper surface 372 (FIG. 9) of the support structure 308 engages an inner surface 374 of the interior channel 363 of the strut 360. Furthermore, the openings 362, 364 may be offset with respect to one another along the y-direction by a distance D (FIG. 8), thereby allowing the free end 350 and the support fastener 330 to exist side-by-side when the support structure 308 is secured to the strut 360. For example, as best shown in FIG. 9, the free end 350 is vertically aligned (e.g., along the z-direction) beneath an adjacent support structure 308. In some approaches, the free end 350 may be inserted through opening 364 prior to the support fastener 330 being secured to the strut 360. In some embodiments, the support fastener 330 is provided between each of the conduits 302.

In various embodiments, the strut 360 may be a unitary strut, as shown, or a double strut. The strut 360 may be a generally U-shaped channel member including the interior channel 363. In the case multiple struts 360 are combined, each exterior surface 370 may be provided directly adjacent one another. However, it'll be appreciated that a variety of configurations are possible in different embodiments.

In sum, as provided herein, the support structures 108, 208, and 308 may be formed using various types of programmable wire forming machines. In one embodiment, a single head 3-D wire forming machine can be used that generally feeds the wire, and that includes a bend head rotating around the wire to the correct position to bend the material to the desired bend angle. In other embodiments, a flexible CNC 3-D wire forming machine can be used that rotates the wire to the correct desired position within the tooling, allowing the programmed bend to be achieved. A support table may be provided to stabilize the wire form during the forming process. In yet other embodiments, a multi-bend machine may be used for high speed, extremely accurate production of complex wire forms, utilizing single or twin head programmable bending. This approach may be ideal for automating complex shapes normally requiring secondary operations such as welding, heading, threading, chamfering, punching, piercing, etc.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A conduit assembly comprising:
   a plurality of conduits arranged substantially parallel to one another;
   a support structure directly adjacent each of the plurality of conduits, the support structure comprising a first member arranged parallel to a second member, wherein the first and second members are arranged transverse to a lengthwise conduit axis of the plurality of conduits;
   a support clamp coupled to the first member of the support structure; and
   a support strap extending around the exterior surface of the plurality of conduits.

2. The conduit assembly of claim 1, wherein the support structure is a single unitary piece of wire.

3. The conduit assembly of claim 1, wherein the support strap is coupled to the support structure.

4. The conduit assembly of claim 1, further comprising a strut, wherein the support structure is directly coupled to the strut.

5. A conduit assembly comprising:
   a plurality of conduits arranged parallel to one another along a lengthwise conduit axis;
   a first member and a second member, wherein the first and second members are arranged transverse to a lengthwise conduit axis of the plurality of conduits, wherein each of the first and second members is disposed around an exterior surface of the plurality of conduits and
   between each of the plurality of conduits, and wherein each of the first and second members includes a first end and a second end;
   a strut, wherein the first end of the first and second members terminates within an interior channel of the strut, wherein the second end of the first and second members extends along an exterior surface of the strut, and wherein the strut includes a first plurality of openings offset from a second plurality of openings in a direction parallel to the lengthwise conduit axis, the first end of the first and second members extending through the first plurality of openings; and
   a support fastener coupling the second end of one or more of the first and second members to the strut, the support fastener extending through at least one of the second plurality of openings, wherein the first end of at least one of the first and second members is disposed side-by-side along the lengthwise axis with the support fastener.

6. The conduit assembly of claim 5, wherein the first and second members are directly coupled to the strut.

7. The conduit assembly of claim 5, the first end of first member being vertically aligned beneath the second end of the second member.

8. A support structure comprising:
   a first section disposed around an exterior surface of each of a plurality of conduits;
   a second section continuing from the first section, the second section extending between each of the plurality of conduits, wherein the second section is perpendicular to the first section; and
   a support strap attached to the second section, the support strap extending around the exterior surface of each of the plurality of conduits.

* * * * *